Oct. 31, 1961  C. J. WEISS  3,006,457
CONVEYOR SYSTEM
Filed Jan. 25, 1960  4 Sheets-Sheet 1
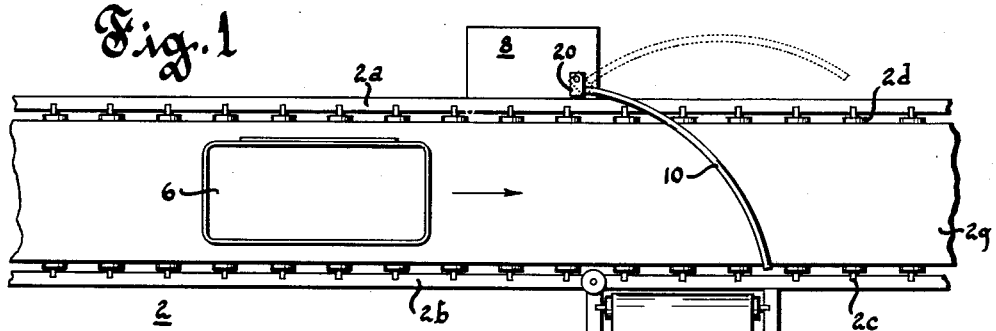
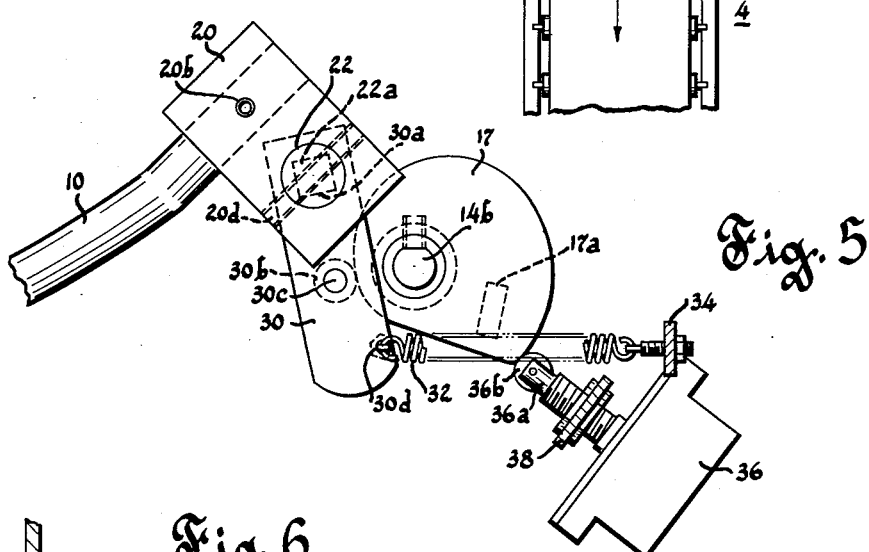
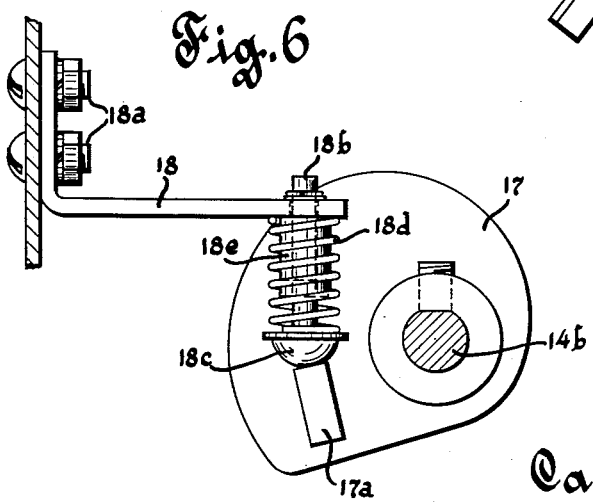
Inventor
Carl J. Weiss
By H R Rather
Attorney

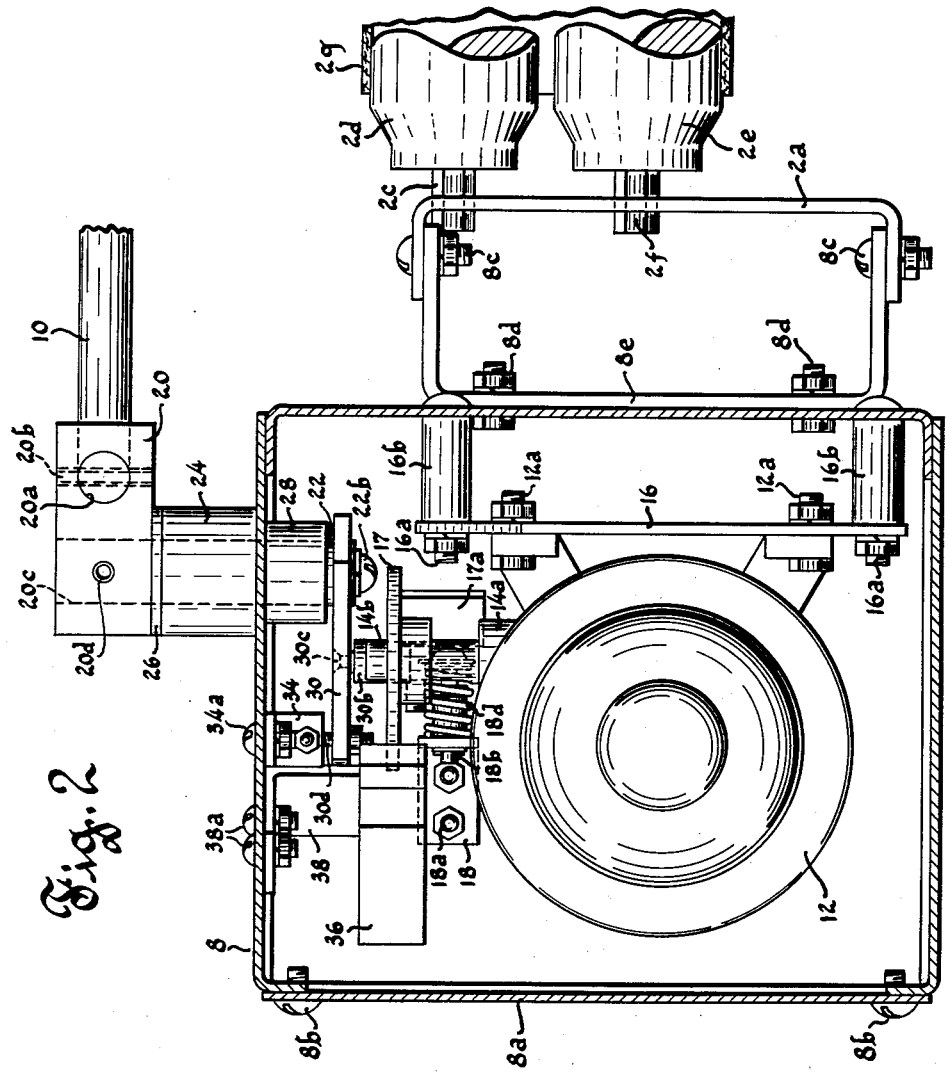

Oct. 31, 1961 C. J. WEISS 3,006,457
CONVEYOR SYSTEM
Filed Jan. 25, 1960 4 Sheets-Sheet 3

Fig. 3

Inventor
Carl J. Weiss
By H. P. Rather
Attorney

Oct. 31, 1961 C. J. WEISS 3,006,457
CONVEYOR SYSTEM
Filed Jan. 25, 1960 4 Sheets-Sheet 4

Inventor
Carl J. Weiss
By H. Rather
Attorney

United States Patent Office 3,006,457
Patented Oct. 31, 1961

3,006,457
CONVEYOR SYSTEM
Carl J. Weiss, Milwaukee, Wis., assignor to Cutler-Hammer, Inc., Milwaukee, Wis., a corporation of Delaware
Filed Jan. 25, 1960, Ser. No. 4,419
7 Claims. (Cl. 198—188)

This invention relates to conveyor systems and more particularly to a diverter mechanism therefor.

While not limited thereto, the invention is especially applicable to a conveyor of the endless belt type or of the belt-driven roller type or the like for diverting the thing being conveyed such as an article or article carrier from a main conveyor to a branch conveyor which is at a substantially right angle or parallel with the main conveyor.

A general object of the invention is to provide an improved diverter mechanism which is applicable to conveyors of different types such as those aforementioned and others.

A more specific object of the invention is to provide an improved article diverter mechanism of the arm type which is efficient and reliable in operation and which is of simple, economical and long lasting construction.

Another object of the invention is to provide an improved motor-controlled mechanism for operating a diverting arm such that the article impact on such arm is not transmitted to the motor gear mechanism.

Another object of the invention is to incorporate in such mechanism improved means for controlling the motor.

Other objects and advantages of the invention will hereinafter appear.

While the apparatus hereinafter described is effectively adapted to fulfill the object stated, I do not intend to confirm my invention to the particular preferred embodiment of diverter mechanism disclosed, inasmuch as it is susceptible of various modifications without departing from the scope of the appended claims.

The invention will now be described in detail with reference to the accompanying drawings, wherein:

FIGURE 1 is a top view of a main conveyor and a branch conveyor and a diverter mechanism constructed in accordance with the invention;

FIG. 2 is a cross-sectional view in front elevation of the diverting arm operating mechanism taken along lines 2—2 of FIG. 4 showing the diverting arm in its diverting position and including a fragmentary portion of the main conveyor;

FIG. 3 is a side elevation view of the diverting arm operating mechanism of FIG. 2 with the cover removed;

FIG. 5 is a top view of the diverting arm and certain elements of its operating mechanism showing the diverting arm in its non-diverting position;

FIG. 6 is a cross-sectional view taken along lines 6—6 of FIG. 3; and

Figure 4:
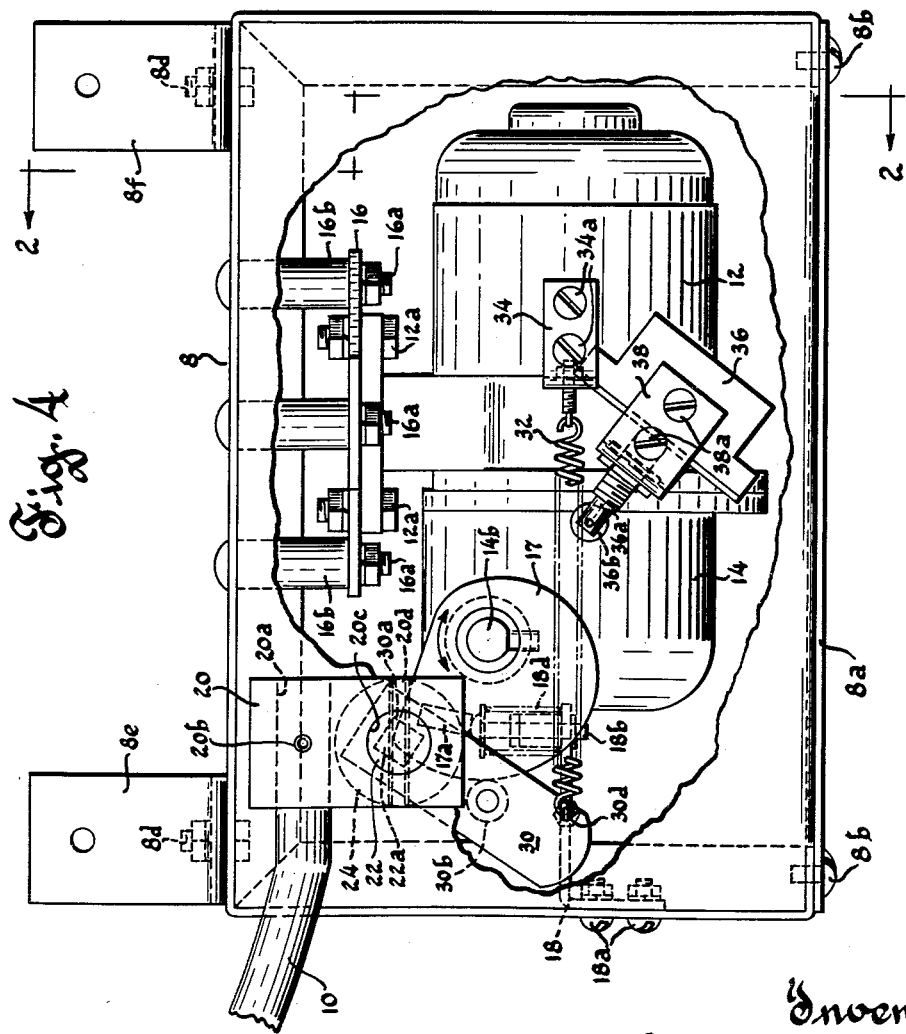
FIG. 4 is a top view of the diverting arm operating mechanism of FIGS. 2 and 3 with the housing partially broken away.

FIG. 7 diagrammatically shows a control circuit for the motor which operates the diverting arm.

Referring to FIGS. 1 and 2, there is shown an article conveyor consisting of a main conveyor 2 and a branch conveyor 4, the latter extending from the right-hand side of the main conveyor at a right angle. The conveyors are of the well-known endless belt type and are adapted for conveying an article or article carrier such as, for example, a tray 6 or the like. Main conveyor 2 is provided with a pair of generally shallow U-shaped support or frame members 2a and 2b, member 2a being more clearly shown in FIG. 2. These members are arranged on edge with their open sides facing in opposite directions to form side rails for the conveyor. The upper inner corners of frame members 2a and 2b are provided with equally spaced notches, each notch on member 2a being in lateral alinement with a corresponding notch on member 2b and each such pair of alined notches being adapted to accommodate and securely support the ends of an axle 2c of a roller 2d. The end portions of axle 2c may be hexagonal shaped or may be provided with suitable flat or partially flat sides to be held against rotation in their associated notches whereas roller 2d is mounted for free rotation on the axle. Another row of rolls 2e (FIG. 2) is mounted below rollers 2d, these rollers having axles 2f the end portions of which are mounted in frame members 2a and 2b in a similar manner. An endless belt 2g is provided so that portions thereof travel over rollers 2d and under rollers 2e, this belt being driven by a suitable power source so that it will convey articles along main conveyor 2. Branch conveyor 4 is similarly constructed and is arranged to receive and convey articles at a right angle from the main conveyor after each such article has been diverted by the diverting mechanism hereinafter described. While branch conveyor 4 is shown as being at a right angle to main conveyor 2 in FIG. 1, it will be apparent that branch conveyor 4 could also be arranged adjacent to and parallel with main conveyor 2.

As shown in FIG. 2, a diverting mechanism having a supporting housing 8 having a removable cover 8a secured by screws 8b and a diverting arm 10 is mounted on the main conveyor on the side thereof opposite from the branch conveyor and immediately adjacent the entry side of the branch conveyor. As will be apparent from FIG. 1, diverting arm 10 is suitably curved and is operable from a non-diverting position shown in dotted lines wherein such arm is clear of the articles traveling along the main conveyor to a diverting position over the main conveyor as shown in solid lines.

As more clearly shown in FIGS. 2, 3 and 4, supporting housing 8 of the diverting mechanism is rigidly secured to conveyor supporting member 2a by a pair of U-shaped brackets 8e and 8f in spaced-apart relation. The legs of brackets 8e and 8f are secured to the upper and lower flanges of conveyor supporting member 2a on the inner sides thereof by suitable bolts 8c or the like. The yoke portions of brackets 8e and 8f are secured to supporting housing 8 by bolts 8d or the like. As shown in FIGS. 2 and 3, a motor 12 and a reduction gear mechanism 14 are rigidly secured to one another and mounted within housing 8. To this end, a vertically arranged supporting plate 16 is mounted on the right-hand wall of housing 8 as seen in FIG. 2 by a plurality of bolts 16a or the like, there being a spacer sleeve 16b surrounding each such bolt between the right-hand wall of housing 8 and the supporting plate to space the latter from the housing. Motor 12 and reduction gear mechanism 14 are secured to supporting plate 16 by a plurality of bolts 12a or the like.

The housing of reduction gear mechanism 14 has integrally formed therewith an upwardly extending sleeve 14a, more clearly shown in FIG. 3, forming a journal bearing for a drive-shaft 14b extending through such sleeve to the exterior of the housing. The exterior portion of drive-shaft 14b is provided with an elongated partially flat side 14c for accommodating the inner end of a set screw whereby a cam 17 is rigidly secured to the drive shaft, the partially flat side on the drive shaft affording sliding adjustment of cam 17 vertically along the shaft. Cam 17 is provided with a depending projection 17a rigidly secured thereto and acting to stop the rotary movement of the cam as hereinafter described.

A resilient stop is provided for engagement with depending projection 17a when the cam is rotated to its limit of movement. As shown in FIGS. 3 and 6, this stop comprises an L-shaped bracket 18 having a relatively short right-angular portion thereof rigidly secured to the back wall of housing 8 by a pair of bolts 18a or the like. The other relatively longer right-angular portion of bracket 18 extends directly into the interior of the housing. The extreme end of such other angular portion of the bracket is provided with a hole for slidably accommodating a stop-pin 18b having an enlarged substantially hemispherical end portion 18c for engagement with depending projection 17a of cam 17, as seen in FIG. 6. Pin 18b is attached to bracket 18 by a washer and cotter pin or the like. Pin 18b is surrounded by a helical compression spring 18d which is disposed between the enlarged end 18c and bracket 18. Pin 18b is also provided with a spacer sleeve 18e surrounding the same within spring 18d to limit the compression of the spring. It will be seen that when cam 17 rotates clockwise as seen in FIG. 6, this being a bottom view of the cam, projection 17a engages enlarged end 18c of pin 18b and slides the shank of the pin in the hole in bracket 18. This sliding action is opposed by the force of spring 18d to provide a resilient stop and such sliding action is positively limited by sleeve 18e.

As shown in FIGS. 2, 3 and 4. diverting arm 10 is rigidly secured to a mounting block 20, one end of diverting arm 10 being inserted into a hole 20a in mounting block 20 and rigidly secured therein by a transverse pin 20b which may be frictionally fitted in the mounting block. Mounting block 20 is supported on a vertically disposed rotary shaft 22 which is journaled in the upper wall of housing 8. To this end, block 20 is provided with a hole 20c for accommodating the upper end of shaft 22 and a transverse pin 20d extends therethrough to rigidly secure the same to one another. Pin 20d may be secured by friction or the like. A sleeve 24 is rigidly secured to and extends upwardly from the upper wall of housing 8 to support shaft 22 and to space block 20 from the housing. A washer 26 is provided between sleeve 24 and block 20 to facilitate rotary movement of the latter. A sleeve 28 is rigidly secured to and extends downwardly from the upper wall of housing 8 for rotatably accommodating the lower end portion of shaft 22. The lower end of shaft 22 is provided with a reduced square portion 22a, more clearly shown in FIGS. 4 and 5, and a threaded axial hole. A laterally extending arm 30 is provided adjacent one end thereof with a square aperture 30a for non-rotatably accommodating reduced square portion 22a of shaft 22 and such arm is rigidly secured to the shaft by a split-ring locking washer and screw 22b or the like. A cylindrical axially-bored roller 30b is rotatably secured to and depended from an intermediate portion of arm 30 by a rivet 30c or the like to serve as a follower for cam 17. Arm 30 is further provided adjacent its other end with an upwardly extending projection 30d for securing a helical tension spring 32 between such projection and an L-shaped bracket 34 depending from the upper wall of housing 8, bracket 34 being rigidly secured to the housing by a pair of bolts 34a or the like. Tension spring 32 serves to return arm 10 to its non-diverting position.

A limit switch 36 is depended from the upper wall of the housing and rigidly secured thereto by an L-shaped bracket 38, the latter being rigidly secured to the housing by a pair of bolts 38a or the like. Limit switch 36 is provided with an actuator 36a having a roller wheel 36b at its external end for cooperation with cam 17 to deenergize the motor when the diverting arm is fully retracted as hereinafter described in connection with FIG. 7.

Referring to FIG. 7, there is shown a control circuit for operating motor 12. The control circuit is connectable through power supply lines L1 and L2 across a single phase alternating current power supply source. Motor 12 is connectable for selective forward or reverse operation across lines L1 and L2 through a reversing switch RS of the manual single-pole double-throw type or the like having a forward contact F and a reverse contact R. The aforementioned limit switch 36 is connected between reverse contact R and motor 12, the same being normally closed as illustrated in FIG. 7 when the diverting arm is in its diverting position shown in solid lines in FIG. 1.

Motor 12 which actuates diverting arm 10 is an alternating current motor of the single-phase type. Motor 12 is of the reversible type and is provided with a pair of operating windings W1 and W2 and a phase-shifting capacitor C. Motor 12 is constructed so that it can be stalled indefinitely as hereinafter described without damage to the windings as by overheating. Windings W1 and W2 of the motor are connectable in parallel across lines L1 and L2, and when so connected, one of the windings is phase-displaced relative to the other winding. To this end, winding W1 is connected between line L2 and stationary forward contact F of switch RS, the movable contact of switch RS being connected to line L1. Winding W2 is connected between line L2 and stationary reverse contact R of switch RS through limit switch 36. Capacitor C is connected between the left-hand ends of windings W1 and W2. As indicated by broken line BL, limit switch 36 is operated by motor 12 and closes when the diverting arm is moved from its non-diverting position toward its diverting position and opens to stop the motor when the diverting arm is moved back to its non-diverting position.

The operation of the diverter mechanism will now be described. When tray 6 approaches the diverting station and it is desired to turn and divert the same onto branch conveyor 4, switch RS shown in FIG. 7 is moved into engagement with forward contact F. Diverting arm 10 shown in FIG. 1 normally rests in its non-diverting position shown in dotted lines and is rotated approximately 45 degrees to its diverting position shown in solid lines in order to divert one or more trays. Closure of switch RS to contact F causes energization of motor 12 across lines L1 and L2, winding W1 being energized directly across the source and winding W2 being afforded phase-shifted energization through capacitor C to start the motor in the forward direction. Motor 12 operates through gear mechanism 14 to rotate shaft 14b and cam 17 counter-clockwise from the position shown in FIG. 5 toward the position shown in FIG. 4. The initial rotary movement of cam 17 permits wheel 36b of limit switch 36 to roll off the extended portion of the cam. This permits actuator 36a to extend under the force of a spring or the like to close limit switch 36 as shown in FIG. 7. Further rotation of cam 17 causes the substantially spiral, radially-incremental surface thereof to act against roller 30b to rotate arm 30 clockwise as seen in FIGS. 4 and 5. Arm 30 correspondingly rotates shaft 22 and diverting arm 10 clockwise approximately 45 degrees to the diverting position shown in FIG. 1. In the diverting position of the arm, depending projection 17a on the cam engages end 18c of stop pin 18b to stop rotation of the cam. This causes the motor to stall while still being energized in the forward direction. Tray 6 then engages the curved portion of arm 10 whereby the same is turned and diverted onto branch conveyor 4 and the latter conveys the same therealong.

To return arm 10 to its non-diverting position, switch RS in FIG. 7 is moved into engagement with reverse contact R. As a result, motor winding W2 is energized directly across lines L1 and L2 through limit switch 36 and winding W1 is afforded phase-shifted energization through capacitor C to energize and start the motor in the reverse direction. Motor 12 acts through gear mechanism 14 to rotate shaft 14b and cam 17 clockwise from the position shown in FIG. 4 to the portion shown in FIG. 5. Tension spring 32 maintains roller 30b in engagement with the cam and causes pivotal movement of arm 10 back into its non-diverting position. When cam 17 reaches its non-diverting position, the relatively straight surface thereof acts on wheel 36b to depress actuator 36a as shown in FIG. 5 to open limit switch 36 and deenergize the motor.

It will be apparent that when arm 10 is struck by tray 6 while it is in its diverting position, the force of the blow is transmitted through shaft 22 to arm 30 and tends to rotate the latter counter-clockwise as seen in FIG. 4. This force is further transmitted from roller 30b through cam 17 radially to shaft 14b. As this force is transmitted radially to shaft 14b, there is no tendency to rotate shaft 14b. As a result, this force is taken up by shaft 14b and is not transmitted to the gear mechanism and the motor thereby to prevent damage thereto.

In the event a tray is in front of the diverting arm when rotation of the latter into its diverting position is started, the arm will strike the tray but no damage can occur to the motor as the latter can withstand stalled conditions. The motor would be stalled until the tray passes out of the way of the diverting arm, and the force of the arm moving into diverting position is insufficient to knock the tray off the conveyor.

I claim:

1. In a conveyor system having a first conveyor and a second conveyor for conveying articles therealong, a diverting station on the first conveyor, diverting mechanism mounted on said first conveyor at the entry side of said diverting station for diverting articles from said first conveyor to said second conveyor, said diverting mechanism comprising a diverting arm having a normal non-diverting position wherein said arm is clear of articles traveling along said first conveyor and a diverting position wherein said arm is displaced by a predetermined angle from said normal position to extend across said first conveyor, means pivotally supporting one end of said diverting arm for rotation between said normal and diverting positions, and operating means for rotating said diverting arm comprising an electrical motor, a driving cam, means connecting said motor to rotate said cam through a predetermined angle, and a cam follower secured to said diverting arm pivotal supporting means and spaced from the center of rotation thereof, said cam follower being actuated by said cam when rotated to cause movement of said diverting arm from said normal position to said diverting position, and said cam follower engaging said cam at a radial point whereby any impact on said diverting arm is transmitted to the center of rotation of said cam to prevent such impact from causing rotation of said cam.

2. The combination with a diverting arm having a normal non-diverting position wherein said arm is clear of articles traveling along a conveyor and a diverting position wherein said arm is displaced by a predetermined angle from said normal position over the conveyor to cause diverting of articles from the conveyor, and means pivotally supporting said arm for rotation between said normal and diverting positions, of means for selectively rotating said arm into its diverting position comprising an electric motor, a driving cam, gear means and a cam shaft connecting said motor to rotate said cam through a predetermined angle when said motor is operated in the forward direction, and a cam follower connected to said arm and radially spaced from said pivotal supporting means, said cam follower being responsive to rotation of said cam for rotating said arm into its diverting position, and said cam follower being arranged to engage said cam at a point radially of the rotational axis of said cam shaft so that the impact of an article against said arm is taken up by said cam shaft and is not transmitted to said gear means.

3. The invention defined in claim 2, together with resilient means biasing said cam follower into engagement with said cam, means for operating said motor in the reverse direction to reversely rotate said cam, and said resilient means being effective to maintain engagement between said cam follower and said cam to effect reverse rotation of said arm back to its normal position.

4. The invention defined in claim 2, together with a power supply source, means for selectively connecting said motor to said source for operation in the forward or reverse direction, a limit switch in circuit with said motor, said limit switch being closed when said arm is in its diverting position, and means responsive when said motor is operated in the reverse direction to retract said arm to its normal position for opening said limit switch thereby to deenergize said motor.

5. The invention defined in claim 2, together with a cushioned stop for engaging said cam to stop rotation of the same when said arm is in its diverting position.

6. In a diverting system for a conveyor comprising a diverting arm having a normal non-diverting position wherein said arm is clear of articles being conveyed along the conveyor and a diverting position wherein said arm is rotated through a predetermined angle from said normal position over the conveyor to cause turning and diverting of articles therefrom onto a side conveyor, and pivot means supporting said arm at one end thereof for rotation between said normal and diverting positions, the improvement comprising control means for selectively rotating said arm between said normal and diverting positions and for automatically stopping said arm in each position, said control means comprising a power supply source, a reversible electric motor, said motor being of the type that can be stalled without damage thereto, switch means operable selectively to establish forward or reverse operating circuits for said motor, a driving cam, gear means and a cam shaft connecting said motor to said cam to rotate the latter, a cam follower connected to said arm and being responsive to operation of said motor in the forward direction for rotating said arm into its diverting position, a limit switch connected in said reverse operating circuit and being normally open when said arm is in its normal position, means responsive to operation of said motor in the forward direction for closing said limit switch, a resilient stop effective to stop rotation of said cam when said arm is in its diverting position, resilient means biasing said cam follower into engagement with said cam and being effective to retract said arm to its normal position when said motor is operated in the reverse direction, and means responsive to retraction of said arm into its normal position for reopening said limit switch to stop said motor.

7. The invention defined in claim 6, wherein said means for closing and reopening said limit switch comprises said cam, said cam being provided with a contour to permit closing of said limit switch in response to initial rotation of said cam by said motor in the forward direction and to cause reopening of said limit switch when said motor completes rotation of said cam in the reverse direction to retract said arm.

References Cited in the file of this patent

UNITED STATES PATENTS

| | | |
|---|---|---|
| 1,535,075 | Knap | Apr. 21, 1925 |
| 2,733,724 | Warren | Feb. 27, 1956 |